UNITED STATES PATENT OFFICE.

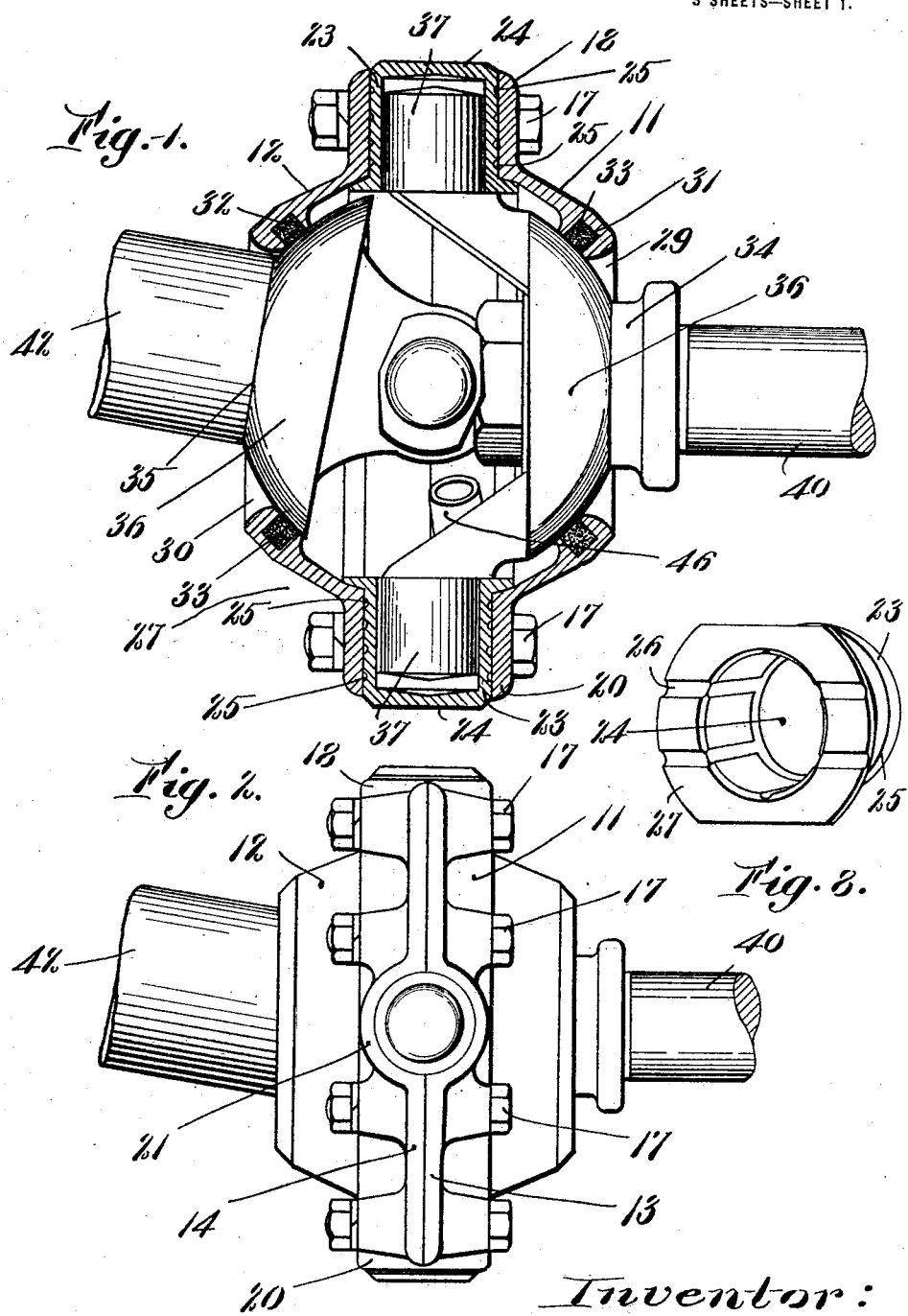

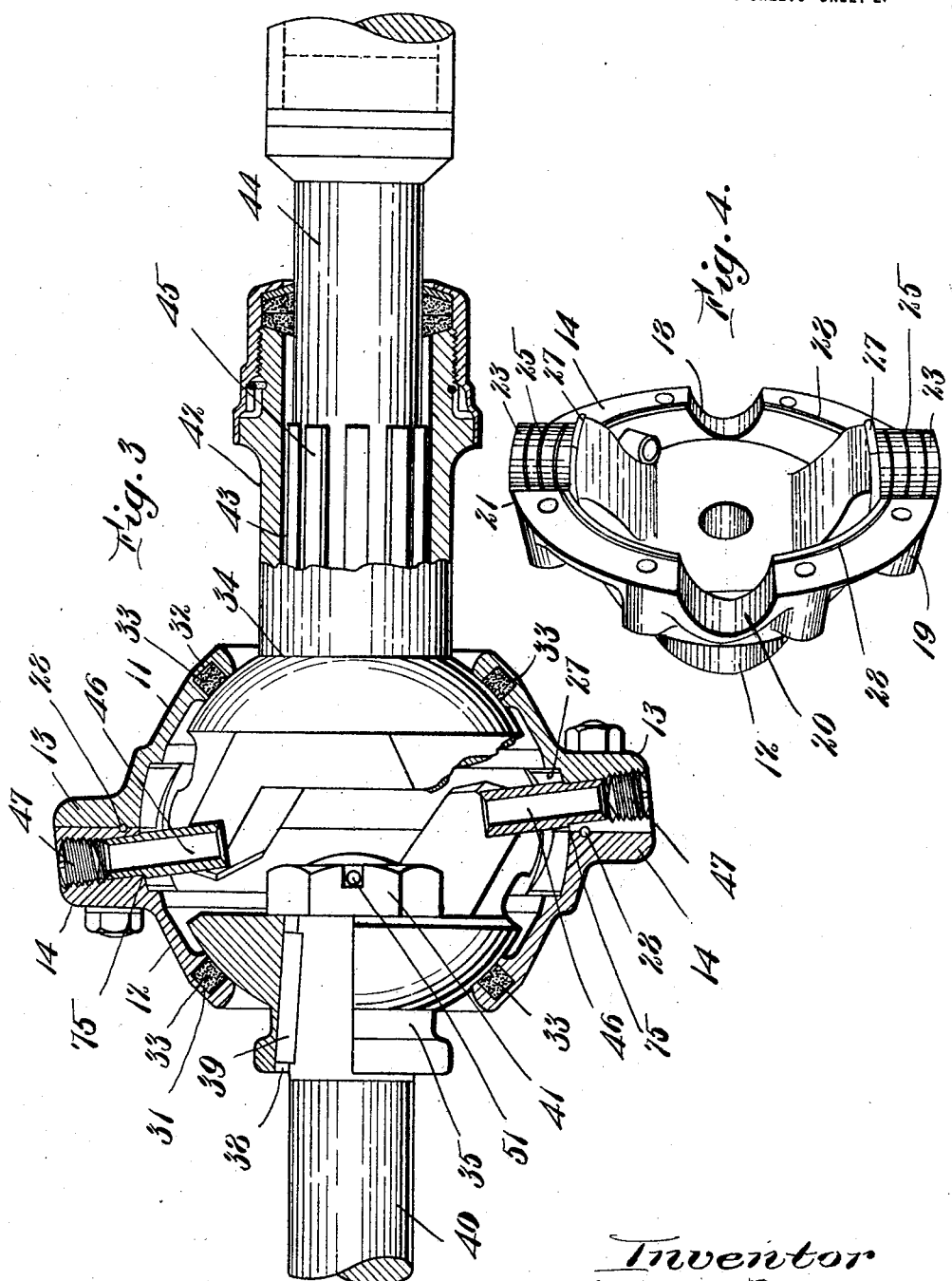

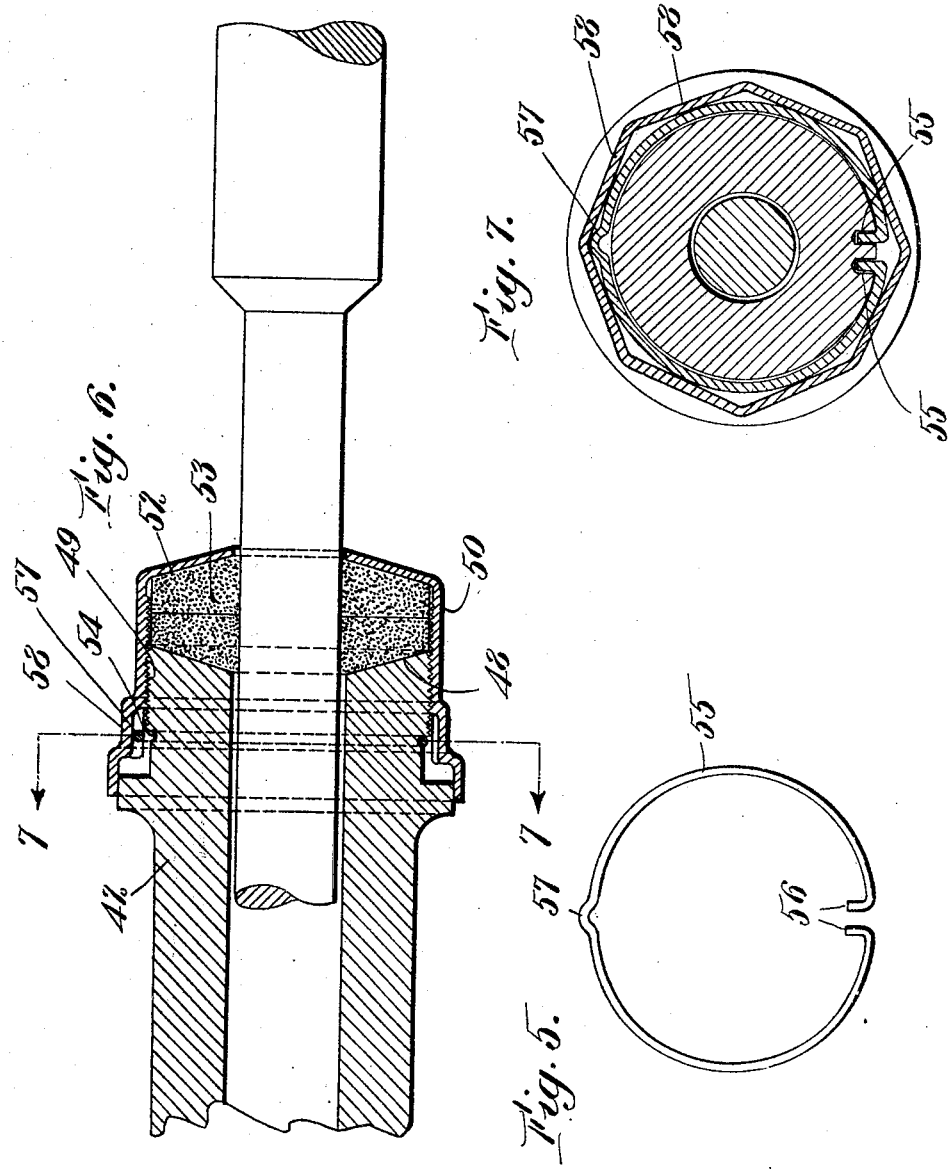

ALFRED B. MORSE, OF SOUTH EASTON, MASSACHUSETTS, ASSIGNOR, BY MESNE ASSIGNMENTS, TO JULIA A. MORSE, OF SOUTH EASTON, MASSACHUSETTS.

UNIVERSAL JOINT.

1,394,184.     Specification of Letters Patent.     Patented Oct. 18, 1921.

Application filed February 24, 1920. Serial No. 360,930.

*To all whom it may concern:*

Be it known that I, ALFRED B. MORSE, a citizen of the United States, and resident of South Easton, in the county of Plymouth and State of Massachusetts, have invented an Improvement in Universal Joints, of which the following description, in connection with the accompanying drawings, is a specification, like letters on the drawings representing like parts.

My present invention relates to universal joints, and more particularly to inclosed self-oiling universal joints of the type described and claimed in my copending application Serial No. 301,935, filed June 6, 1919, now Patent No. 1,344,707, issued June 29, 1920.

The universal joint described and claimed in the present application may, in certain particulars, be considered as an improvement over that described and claimed in the application above referred to. In simplifying the manufacture of universal joints of this type, it was found that the method of loading the interior of the lubricant chamber heretofore employed, was inefficient in that the tendency was to provide an excess of lubricant and to close the chamber without rotating the joint through a half revolution to drain out the excess lubricant. I have remedied this defect by the provision of a pair of diametrically arranged tubes leading into the chamber and which provide positive means for insuring that only the right amount of lubricant is used.

Again, my improved method of providing a sealed chamber made up of a plurality of parts having various orifices therein, by means of oil joints is distinctly new in this art, and I desire to claim the same broadly.

Further, my improved means for retaining the bushings in position obviates the necessity of shoulders thereon, or the use of keys therewith, and makes a simpler and more efficient structure.

As it is necessary to provide a floating shaft when the universal joint is used for the transmission of power in motor vehicles, and as no efficient means of retaining the packing nut in position was available, I have devised an improved form of nut lock which is efficient and at the same time simple in construction.

The principal object of my invention therefore, is an improved universal joint having a hermetically sealed chamber for the lubricant, and in which all parts are lubricated by centrifugal action without loss of lubricant.

Another object of my invention is an improved nut-lock for locking a nut in any one of a plurality of positions.

Other objects and novel features of construction and arrangement of parts will appear as the description of the invention progresses.

In the accompanying drawings illustrating the preferred embodiment of my invention, Figure 1 is a longitudinal sectional view through the casing, the segments of the joint being shown in elevation;

Fig. 2 is an elevational view of my improved universal joint;

Fig. 3 is a longitudinal sectional view through the casing, the segments being shown partly broken away;

Fig. 4 is a perspective view of one-half of the casing;

Fig. 5 is a view of my improved locking means for packing nuts and the like;

Fig. 6 is a sectional view of a packing nut applied to a stuffing box, the locking means being shown in position;

Fig. 7 is a section on the line 7—7 of Fig. 6, showing the manner of attaching the locking means to the suffing box, and Fig. 8 is a perspective view of the journal bearing.

Referring to the drawings, and particularly to Figs. 1-4 inclusive, 11 and 12 designate sections, each partially spherical and with rigid flanges 13 and 14, respectively, constituting the meeting edges, and means for uniting the two sections 11 and 12 of the outer casing. These two flanges 13 and 14 are united by bolts 17, 17, a plurality being provided around the rim, and thus serves as a rigid firm construction, reinforcing and uniting the two casing members 11 and 12 together. On the inner surface of the flanges 13 and 14 are provided circumferential grooves 28 which register with each other and coöperate to form a shellac packing groove that prevents leakage of lubricant from the interior of the casing formed by the sections 11 and 12. I also utilize these flanges 13 and 14 as a portion of the lugs for the journal bearings 18, 19, 20, and 21 for the pivots of the inner members. These journal bearings are adapted to receive linings or bushings 23, closed at their outer ends 24 to provide a covering to exclude dust or other impurities from the universal joint, and also to prevent leakage of lubricant therefrom. Each bushing is also provided with a flange 27 on its inner end, which coöperates with the sections 11 and 12 to prevent outward movement of the bushing, oil grooves 26 in the flange 27 and body of the bushing 23 insuring a flow of oil or other lubricant to the pivot bearings, to be hereinafter described. Further, each bushing is provided with a plurality of circumferential shellac holding grooves 25 on its outer surface.

The sections 11 and 12 curve upward and inward, as shown in Figs. 1, 2, and 3, to define circular openings 29 and 30 respectively, through which extend the hubs of the universal joint. The inner lip of the openings 29 and 30 are provided with circular channels 31 and 32 respectively, in which are placed packing 33.

Hubs 34 and 35 are provided with substantially semi-spherical bosses 36 which engage with the packing 33 in the channels 31 and 32, to exclude dust and prevent escape of lubricant from the chamber, above referred to. On the inner face of the bosses 36 are placed diametrically arranged trunnions 37, 37 of suitable diameter to fit in the bushings 23. One of the hubs, as 35, is provided with a tapered hole 38, in which is keyed, by the key 39, the end of the rigid, or non-longitudinally movable shaft 40, a castellated nut 41 and cotter pin 51 holding the shaft 40 firmly in position. The other hub, as 34, is provided with a hollow extension 42, a plurality of splines 43 being arranged on the interior thereof, and with a stuffing box, to be hereinafter described, at its outer end. A longitudinally movable shaft 44 is provided at one end with a plurality of splines which register with the splines 43 in the hollow extension 42, and allows the shaft 44 to move longitudinally of, but to rotate with, the hub 34.

Each of the sections 11 and 12 is provided with interiorly projecting oil tubes 46, which, when the sections are assembled, are diametrically arranged with respect to each other. These tubes are shouldered at 75 and are forced into perforations in the concave portions of the sections 11 and 12, and permanently fastened in position by swaging. Such tubes extend into the chamber formed by the sections a predetermined distance and control the amount of lubricant it is desired to have in the chamber. The outer ends of the perforations in the sections are tapped to receive plugs 47, which prevent the entrance of foreign matter into the casing from the outside. These plugs 47, while desirable for the purpose outlined, are not essential for a successful working of the joint.

The method of assembling my improved universal joint and the manner in which the chamber, above referred to, with lubricant, will be apparent from an inspection of the drawings, the coöperating faces of the sections 11 and 12, and the inner surfaces of the portions 18, 19, 20, and 21 being coated with shellac, which is allowed to partially dry, or become "tacky" before the elements are assembled.

Assuming that the universal joint is assembled, as shown in the above noted figures, and that it is desired to provide the joint with lubricant, the mechanism is brought to the position shown in Fig. 3, with the tubes 46 in their extreme upper and lower positions, respectively. The plugs 47 are now removed and lubricant, preferably a heavy oil, is poured into the upper tube 46 until the chamber is filled to the point where the lubricant will overflow at the lower tube. Both plugs 47 are now replaced and the universal joint is ready for use.

The chamber in which the lubricant is located being practically a sealed chamber, there is no escape of lubricant, and consequently no waste. Further, as the joint, when in use, is rotated on the axis of the fixed shaft 40, the lubricant within the chamber is projected outwardly, practically flooding the trunnions 37, 37 and the bushings 23 with lubricant, this action placing the lubricant where it is required.

On the outer end of the extension 42 is provided a stuffing box comprising a recessed end face 48 of the extension 42, a threaded outer end 49 and a packing nut 50, the nut 50 being bored and recessed at 52, which recessed portion coöperates with the end face 48 to form a chamber to hold the packing material 53.

The extension 42, adjacent the threaded outer end 49 is provided with a circumferential groove 54, two holes 55, adjacent each other, being provided in the groove 54, as shown in Fig. 7. A ring 65, substantially circular in form, is provided on its extremity with inwardly projecting extensions 56 which fit into the holes 55 and hold the ring in position in the groove 54. Diametrically opposite the extension 56 is an outwardly extending projection 57, which extends into the angle made by two adjacent faces 58 of the octagonal nut portion of the packing nut 50, as clearly shown in Fig. 7.

The operation of my improved nut lock is as follows, assuming the ring 65 to be in position on the extension 42, as shown in Fig. 7. The packing nut 50 is screwed onto the threaded end 49 of the extension 42, and, as the inner faces 58 of the octagonal nut portion of the packing nut 50 moves rearwardly, or to the left as viewed in Fig. 6, the projection 57 is engaged by each of the faces 58 in succession forcing the projection into the groove 54 and the intermediate portions of the ring 65 outwardly from such groove. As each face 58 passes the projection 57, the resilient intermediate portions of the ring 65 force the projection 57 outwardly into the angle formed by adjacent faces 58, securely locking the packing nut 50 in adjusted position. While the nut portion of the packing nut 50 has been described and shown as octagonal, it is evident that a nut portion having any number of faces may be employed.

While I have described and shown the preferred embodiment of my invention somewhat in detail, it is to be understood that I may vary the shape, size, and arrangement of parts making up my device within wide limits without departing from the spirit of the invention.

Having thus described my invention, what I claim as new and desire to secure by Letters Patent, is:—

A universal joint construction, having a pair of substantially concave members coöperating to define a hollow chamber, said members being united at their contacting faces, in a semi-spherical form, each of said concave members having formed entirely through one part, an extending tube, at a diametrically opposite position from the extending tube in the other part, one of said tubes permitting the filling of the inclosed structure with oil, and the other tube determining the height of the oil supplied.

In testimony whereof I have signed my name to this specification.

ALFRED B. MORSE.